Patented Jan. 1, 1935

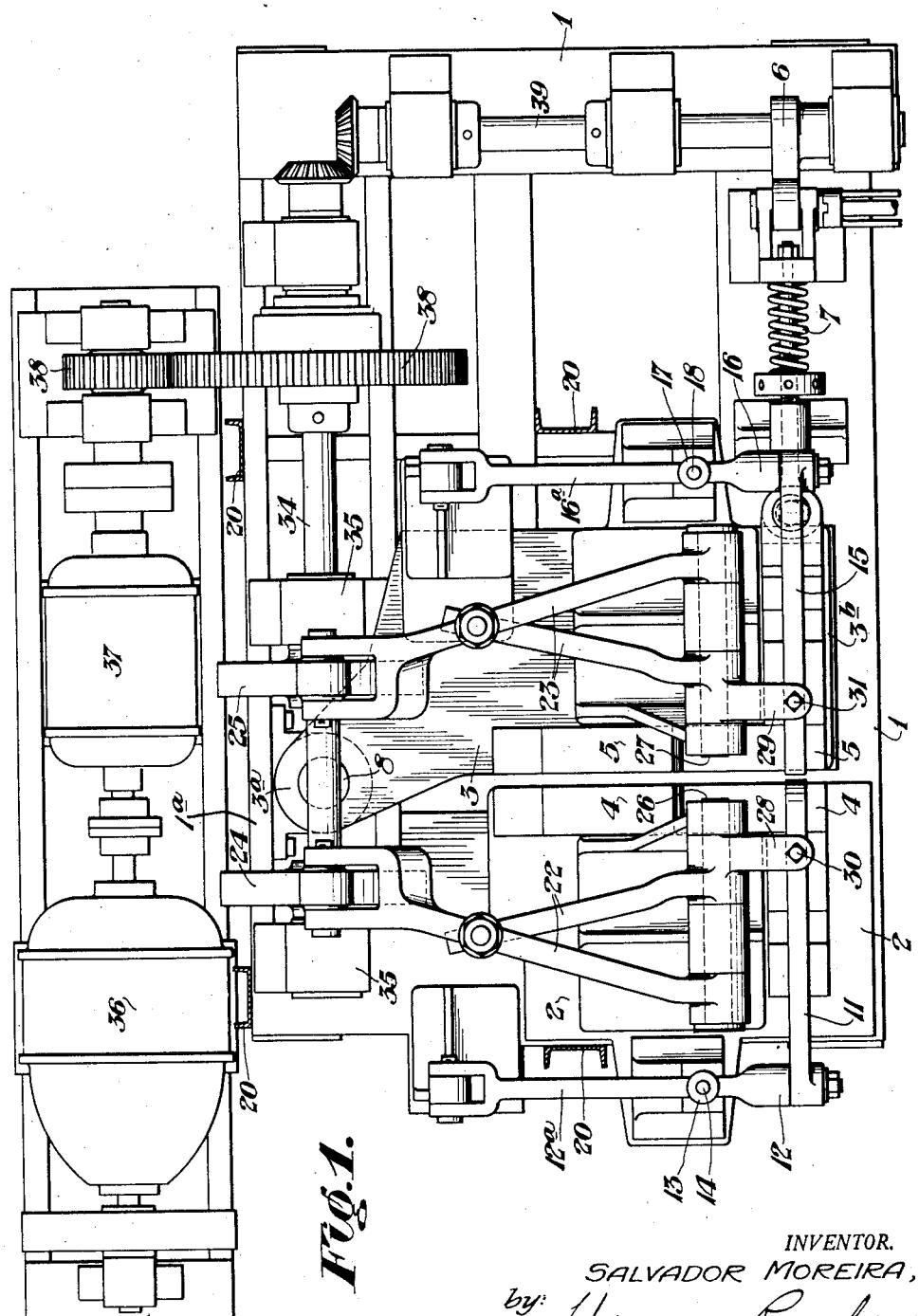

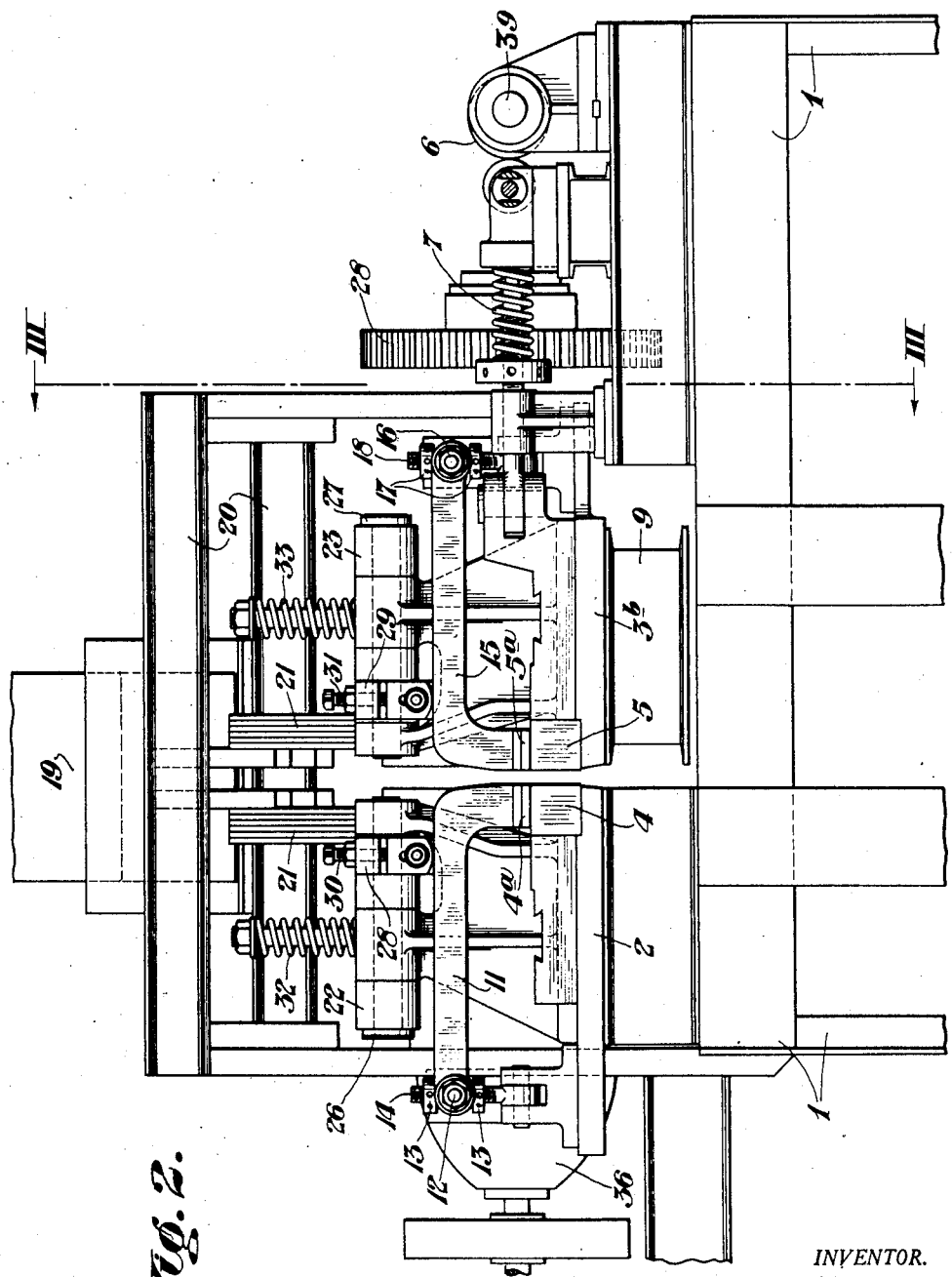

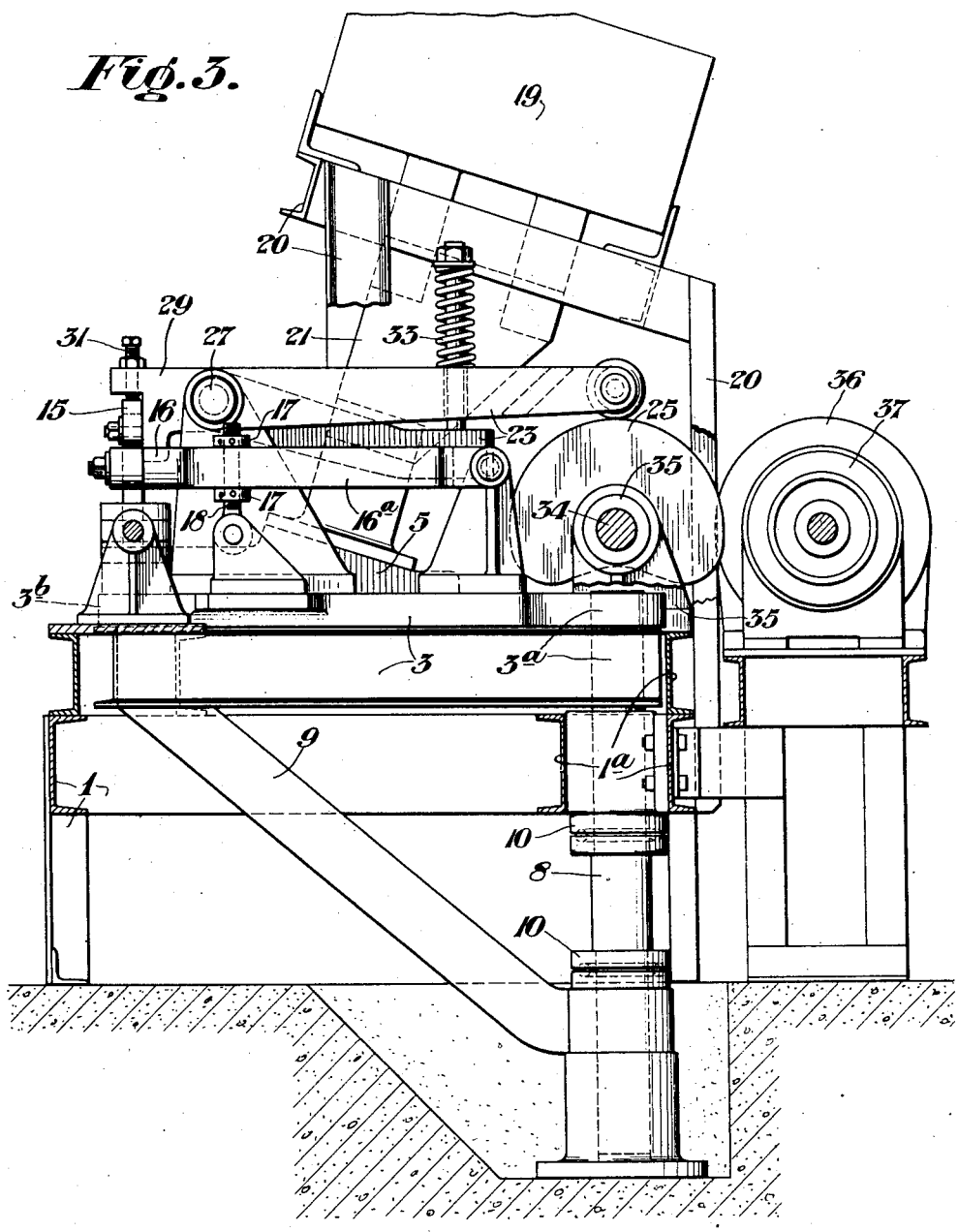

1,986,740

UNITED STATES PATENT OFFICE 1,986,740

WELDING MACHINE

Salvador Moreira, Worcester, Mass., assignor to The American Steel and Wire Company of New Jersey, a corporation of New Jersey Application December 29, 1933, Serial No. 704,556

3 Claims. (Cl. 219—17)

This invention relates to welding machines, the objects including the provision of an improved means for clamping the work to be welded together, so that there is no undue damage from sparking or mechanical unsteadiness. They also include the provision of a novel means for operating a work clamping means so that the various parts which must necessarily move when the work is brought to a welding position, do not bind or require excessive operating power. Other objects may be inferred.

The accompanying drawings illustrate a butt-welding machine embodying the present invention, the various figures being as follows:

Figure 1, a top view;
Figure 2, a front view; and
Figure 3, a sectional end view.

This machine includes a base frame 1 which mounts a stationary support 2 and a movable platen 3. Dies 4 and 5 are mounted by the support 2 and the platen 3, the work to be welded together being clamped to these dies and the platen 3 being moved by a rotary cam 6 operating through a spring 7.

The machine being described is primarily intended for use in the manufacture of rail bonds by the flash butt-welding process. In this process the pieces to be welded together are held in easy contact with each other so that sparking occurs between the two, whereupon they are moved together with great force. Consequently, the pieces being welded must be very firmly clamped, since electrical sparking between them and the dies, or mechanical unsteadiness, may spoil the product.

Now in the manufacture of rail bonds, one or both of the pieces to be welded together are made of copper. This introduces difficulties which are not met when the material being welded is steel. Clamp arrangements operated by fluid cylinders or mechanical cams have often proven unsatisfactory under such circumstances.

One of the reasons some arrangements are not so good is the fact that the members which must clamp the work against the dies cannot be properly alined. That is to say, there is a tendency to loosely engage the work immediately adjacent the weld, heating and excessive sparking then taking place.

Another trouble is that the platen which must move, is ordinarily a slidable affair working in a straight line on tracks, a lever operating the clamping member and extending to an operating cam or cylinder motor. This introduces a severe torque in the platen, causing binding and the necessary use of heavy operating power.

To eliminate the above undesirable conditions, the platen 3 of the machine being described has one portion $3^a$ mounted for turning movement about an axis so that another portion $3^b$ may be swung toward the fixed support 2. This mounting may be done by providing a heavy vertical axle 8 to which the platen is fastened. Preferably, an arm 9 is used to brace the platen against its weight, and roller thrust-bearings 10 provided to eliminate friction, as will be described. It is obvious that the portion $3^a$ of the platen moves in a curve and that it, along with the die 5 and its cooperating clamping member, constitutes a work holding means.

This clamping member $4^a$, which holds the work in the die 4, is mounted by one end of an arm 11 having its other end adjustably mounted for turning movement to permit this member to swing towards the die. Such mounting may be by means of a suitable bearing 12 carried by a support $12^a$ whose position may be controlled by nuts 13 carried by a screw 14. This screw and the arm $12^a$ are mounted by the fixed part of the machine.

A similar arm 15 is mounted by a bearing 16 carried by a support $16^a$ which may be adjusted by nuts 17 on a screw 18. These elements are all mounted by the platen 3 at its swinging portion $3^b$. This arm 15 carries a member $5^a$ for engagement with work in the die 5.

The arms 11 and 15, when provided with a suitable powering agency, serve to clamp the work to the dies 4 and 5. It should be noted that the members $4^a$ and $5^a$ move in a curve, whereby adjustment of the bearings 12 and 16 enable engagement of the work at differing points. That is to say, an upward movement of the bearings 12 and 16 will cause the work to be clamped at points closely adjacent the weld, this being desirable since it effects the shortest possible path for the welding current supplied to the dies 4 and 5. Different sizes of work may be accommodated by such adjustment.

A further feature of the above is the respective arrangement of the arms 11 and 15. This is such that the two arms mutually aline when the platen 3 is swung towards the support 2 in the welding operation, the arms' turning points being at opposite extremes so that the members $4^a$ and $5^a$ may properly cooperate with the dies 4 and 5. This arrangement secures the desired concentrated clamping effect close to the weld.

Most welding machines also cause trouble when operated according to the flash butt-welding process in that the flash wastage falls on the necessary electrical transformer. In the machine being described the transformer 19 is mounted at an elevated position by a framework 20. This transformer may be of the usual type, the welding current being transmitted from it to the dies by heavy flexible leads 21. It is obvious that the transformer is protected against flash wastage because of its elevated position.

Another important feature of the invention is the method of powering the arms 11 and 15, and particularly respecting the latter arm which is mounted by the movable platen 3ª, it being remembered that binding frequently occurs here in other arrangements. This powering is done by levers 22 and 23 which extend from operative connections with the arms 11 and 15 toward the axis about which the platen 3 turns. More specifically, these arms extend until adjacent and substantially in line with the axle 8.

Cams 24 and 25 operate the ends of the levers 22 and 23 which are fulcrumed by axles 26 and 27, the operative connection between these levers and the arms 11 and 15 being by way of stub arms 28 and 29, the latter connecting to the clamping arms through adjustable screws 30 and 31. Springs 32 and 33 keep the levers 22 and 23 in engagement with the cams 24 and 25, and also serve to lift the arms 11 and 15 to release positions.

Now it is to be particularly noted that the cams 24 and 25 are carried by a shaft 34 journaled in a yoke 35. This is mounted by the base frame 1 so as to position the shaft 34 at a right-angle to the axle 8 and directly over and in line with the same. Rotation of these cams, in the operation of the levers 22 and 23, naturally results in a force tending to tip the turning portion 3ª of the platen 3 upwardly, as well as an equal force tending to push the shaft 34 downwardly. According to the present invention, these forces are balanced against each other whereby no torque results in the platen.

Thus, the yoke 35 is mounted by the frame 1 so as to transmit the push from the shaft 34 through the frame members 1ª to the thrust bearings 10, this placing the force on the axle 8 to which the turning portion 1ª of the platen is fixed and thereby accomplishing the desired result, since the axle carries the torque counteracting force to the platen.

The other end of the yoke 35 is mounted directly in connection with the fixed support 2, whereby the same result is secured except without the aid of the axle. The turning movement of the lever 23 respecting the cam 25, resulting from the swinging of the platen 3, is so slight that no trouble is experienced.

A motor 36, which drives through a gear reduction unit 37 and gearing 38, powers the shaft 34. This shaft 34 is geared to a shaft 39 on which the cam 6 is mounted. All the parts are synchronized so that the arms 22 and 23 are operated to clamp the work to the dies 4 and 5, whereupon the platen 3 is swung in the welding operation, the levers 22 and 23 being finally released so that the work is unclamped. This sequence of operations, and the application and duration of the welding current, may be timed according to the desires of the operator of the machine.

All of the details shown by the drawings are not specifically described because they are not needed for the purpose of disclosing the features of the present invention.

I claim:

1. A welding machine including the combination of a support, work clamping means associated with said support, an axle, a platen having one portion turning on said axle so that another portion may swing towards said support, work clamping means associated with the swinging portion of said platen for registration with the first named clamping means, a lever in operative connection with the first named clamping means and extending until adjacent and substantially in line with said axle, a lever in operative connection with the second named clamping means and extending until adjacent and substantially in line with said axle, cams operatively associated with the first and second named levers, a shaft for mounting said cams and means for mounting said shaft so as to transmit forces from the same to the turning portion of said platen.

2. A welding machine including two supports, one of which may be moved towards the other, each of said supports mounting two cooperative members between which work is clamped, in each instance one of said members being stationary respecting the other and an arm mounting the latter member at one end, the other ends of said arms being respectively mounted for turning movements by the respective supports, and said arms being arranged for mutual alinement when said movable support is moved towards the other of said supports.

3. A welding machine including a stationary support, a platen having one portion turning on an axis so that another portion may swing toward said fixed support, said support and said platen at its swinging portion each mounting two cooperative members between which work is clamped, in each instance one of said members being stationary respecting the other and an arm mounting the latter member at one end, the other ends of said arms being respectively mounted by said support and said platen for turning movement and said arms being arranged for mutual alinement when said platen swings towards said support, levers being arranged in operative connection with said arms and extending towards the axis on which said platen turns and cams being provided for moving said levers, the cam moving the lever operating the arm on said platen being mounted to transmit the force resulting from movement of said lever to the turning portion of said platen.

SALVADOR MOREIRA.